United States Patent [19]

Rosewell

[11] 4,045,284
[45] Aug. 30, 1977

[54] NUCLEAR REACTOR FUEL CONTAINMENT SAFETY STRUCTURE

[76] Inventor: Michael P. Rosewell, 5155 S. Natchez Ave., Chicago, Ill. 60638

[21] Appl. No.: 556,692

[22] Filed: Mar. 10, 1975

[51] Int. Cl.² .............................................. G21C 9/00
[52] U.S. Cl. ...................................... 176/38; 176/37; 176/49
[58] Field of Search ...................... 176/37, 38, 87, 40

[56] References Cited

U.S. PATENT DOCUMENTS

| | | | |
|---|---|---|---|
| 3,378,452 | 4/1968 | Costes | 176/40 |
| 3,607,630 | 9/1971 | West et al. | 176/38 |
| 3,629,064 | 12/1971 | Zivi | 176/38 |
| 3,664,923 | 5/1972 | Connolly | 176/40 |
| 3,677,892 | 7/1972 | Schabert | 176/37 |
| 3,702,802 | 11/1972 | Jansen, Jr. | 176/38 |
| 3,719,556 | 3/1973 | Snyder et al. | 176/38 |

FOREIGN PATENT DOCUMENTS

| | | | |
|---|---|---|---|
| 1,352,950 | 1/1963 | France | 176/60 |
| 958,088 | 4/1964 | United Kingdom | 176/40 |

OTHER PUBLICATIONS

Trans. ANS vol. 13, No. 2, Nov. 13, 1970 "Core Melt--Through in LMFBR's"-Fontana-pp. 720-721.
Trans. ANS vol. 13, No. 1, June 26, 1970; "Fast Reactor Fuel Interactions . . . Meltdown"-Jansen et al., p. 376.

*Primary Examiner*—Stephen C. Bentley
*Assistant Examiner*—Ralph Palo
*Attorney, Agent, or Firm*—Evan D. Roberts

[57] ABSTRACT

A nuclear reactor fuel containment safety structure is disclosed herein and is shown to include an atomic reactor fuel shield with a fuel containment chamber and exhaust passage means, and a deactivating containment base attached beneath the fuel reactor shield and having exhaust passages, manifold, and fluxing and control material and vessels.

1 Claim, 8 Drawing Figures

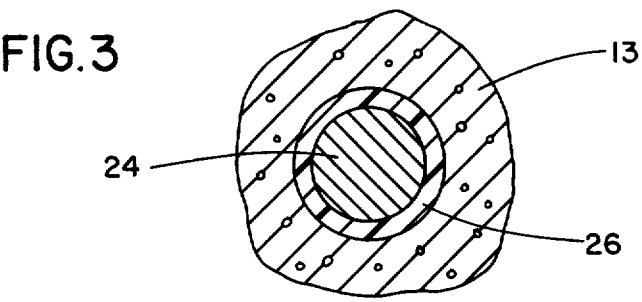
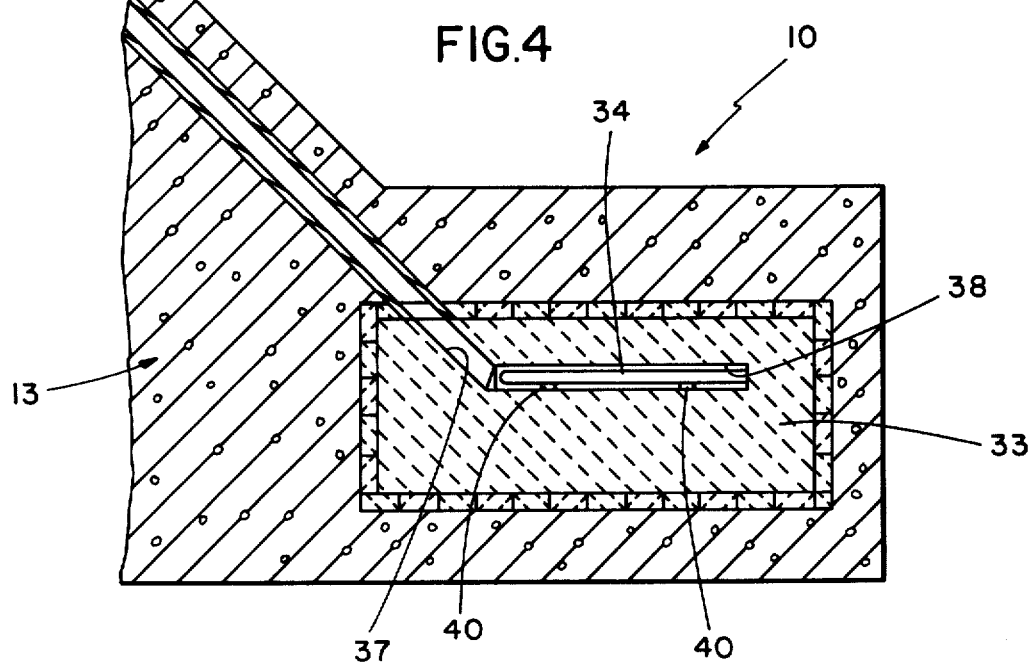
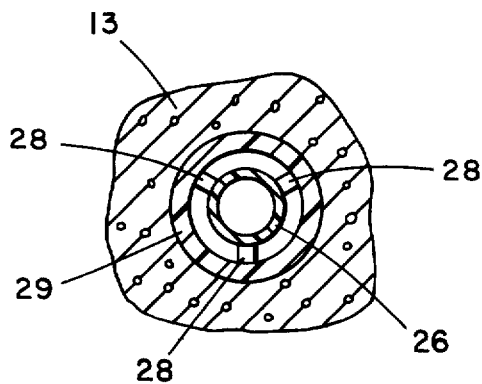
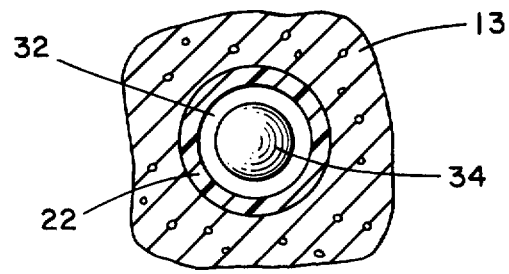

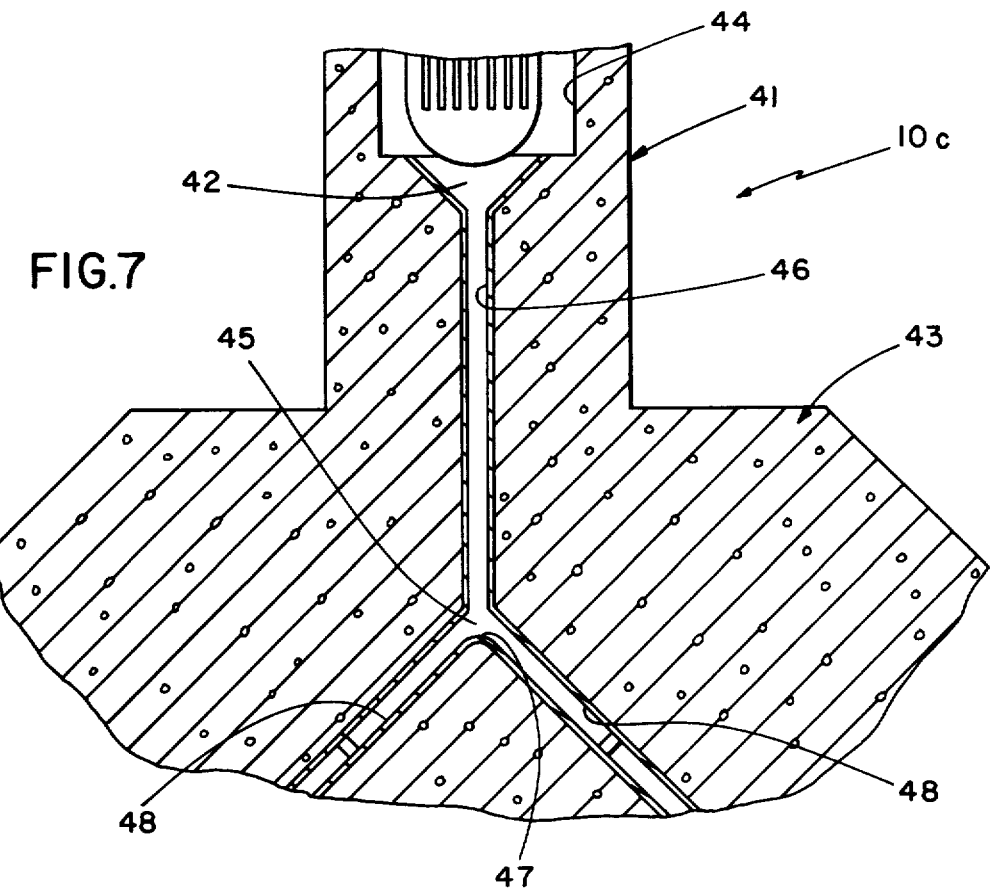
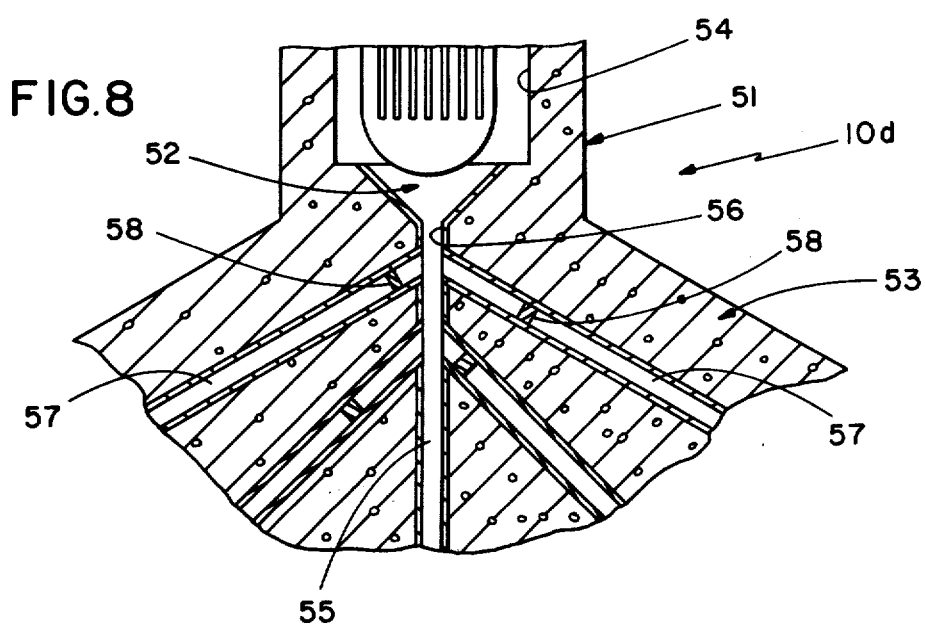

4,045,284

NUCLEAR REACTOR FUEL CONTAINMENT SAFETY STRUCTURE

BACKGROUND OF THE INVENTION

In a nuclear reactor, there is a danger that the nuclear fuel might get hot enough to melt and escape its containment, which would cause the release of large amounts of deadly radiation into the environment. Ordinarily reactor's are provided with water cooling ducts and other apparatus for maintaining the temperature of the fuel of the reactor, however, in the event of a failure of the cooling system, the reactor fuel will elevate the temperature to a point where the fuel will become melted into a flowing mass. This fluid flowing mass, will in turn, tend to increase its own temperature while it continues as a mass. Such a mass of molten fuel is extremely radioactive and accordingly, causes its own temperature elevation to a point where primary and secondary containments will be breached and will thereby expose the radioactive material to the environment.

SUMMARY OF THE INVENTION

It is, therefore, an object ot this invention to provide a means for preventing escape of radioactive material into the environment from a nuclear reactor in which a gross core melt down has occurred.

In this regard, this invention provides a reactor shield having a fuel containment chamber adapted to contain an atomic reactor and the reactor fuel therein. However, in the event of a gross core melt down of the reactor, the reactor shield is provided with an exhaust passage means whereby the melt down fuel and general radioactive mass produced thereby, will pass from the reactor shield and into a deactivating containment base provided by this invention. The deactivating containment base is provided with a dispersal means for receiving the radioactive mass of the melt down as it flows from the reactor and to distribute the flowing mass to separate the fuel into a plurality of smaller masses, which are preferably subcritical, whereby nuclear interaction, heat production, and dangerous isotope production are thereby reduced, the containment base acting as shielding between the masses and also functioning as a heat sink.

Another embodiment of the invention further provides fuel fluxing material in the base dispersion means whereby the dangerously temperature elevated fuel mass, which is dispersed within the base, will be further cooled by the action of dissolving fluxing material with the fuel mass being dispersed within the base and thereby further provide for means for cooling the fuel. The fluxing and control material are maintained in a position apart from the core to eliminate uncertainties involving prolonged exposure of such materials to the core.

Other advantages and novel aspects of this invention will become apparent from the following detailed description, in conjunction with the accompanying drawings wherein FIG. 1 is a vertical section view taken through the nuclear reactor fuel containment safety structure of this invention showing the interrelationship of the fuel reactor shield, exhaust passage means, and the deactivating containment base thereof.

FIG. 3 is a section view taken along line 3—3 of FIG. 1 showing the configuration and positionment of a dispersion melt plug in a diffusion passage.

FIG. 4 is a partial vertical section view of a second embodiment of this invention taken along line similar to that for FIG. 1 showing an alternate termination structure for the diffusion passages.

FIG. 5 is a partial sectional view taken along line 5—5 of FIG. 4 showing the collapsible support of diffusion passages within the containment base.

FIG. 6 is a partial sectional view taken along line 6—6 of FIG. 4 showing the positionment and containment of infusion material in a diffusion passage opening downward into a refractory vessel.

FIG. 7 is a partial vertical section view of a fourth embodiment of the invention showing the fuel reactor shield and chamber with an open exhaust passage opening into manifold and passage diffusing means.

FIG. 8 is a partial vertical section view of a fifth embodiment of the invention showing an open exhaust passage and with a vertical distribution of passage dispersal means.

Figure 1:
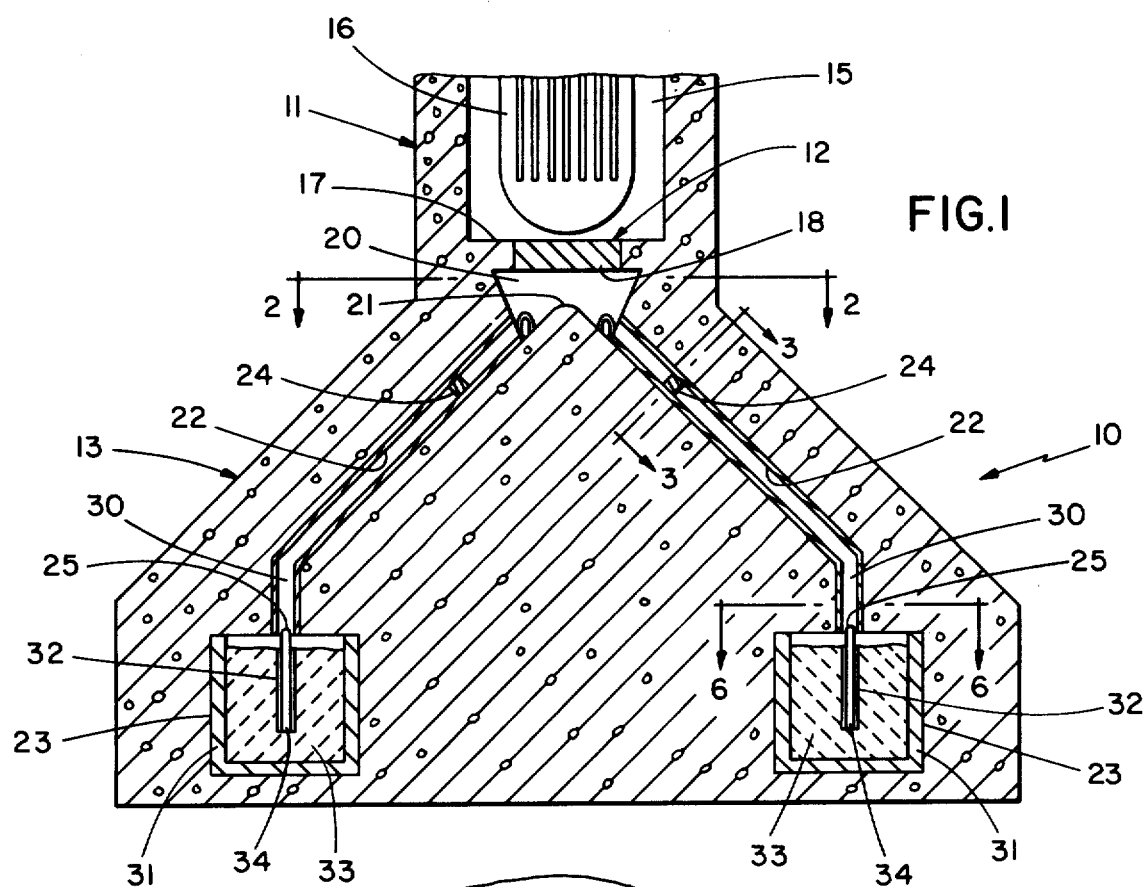
Figure 2:
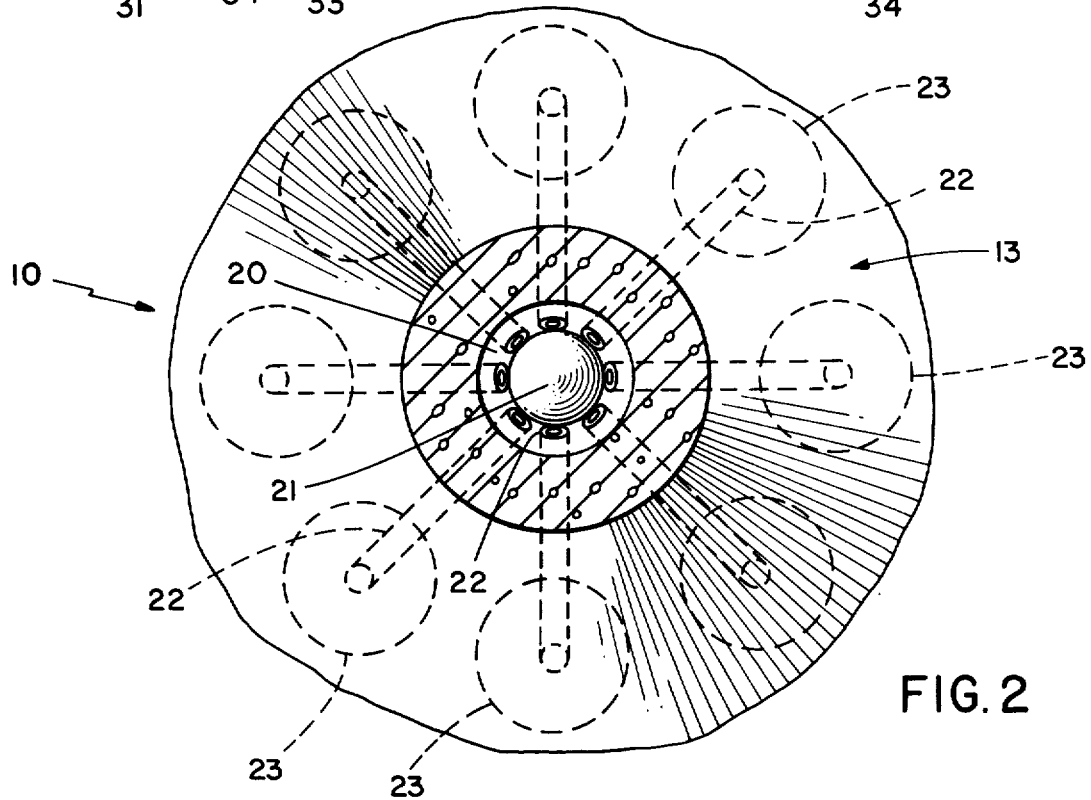
FIG. 2 is a section view taken along line 2—2 of FIG. 1 showing the dispersion manifold chamber and the radially positioned diffusion passages extending therefrom.

A first embodiment of the nuclear reactor fuel containment safety structure of this invention is variously disclosed in FIGS. 1–3 and is generally illustrated by the number 10. This first embodiment 10 includes, generally, a fuel reactor shield 11 (FIG. 1) an exhaust passage means 12, and a deactivating containment base 13.

Fuel reactor shield 11 is illustrated as a concrete structure with a fuel containment chamber 15 adapted to contain an atomic reactor 16 with the reactor fuel therefor. Floor 17 of reactor shield 11 can be an integral part of shield 11, as it is illustrated, or in the alternative, floor 17 could be provided, preferably in the central section of shield 11, with a rupture panel 18 which, when subjected to any molten radioactive mass, would be dissolved with the mass or otherwise give way thereto to allow the temperature elevated mass to flow from chamber 15 of shield 11, by passing downwardly through such an exhaust passage means, and into containment base 13.

In any event, this invention 10 includes a floor exhaust passage structure means 12 for fuel reactor shield 11 which, when the reactor shield is subjected to a temperature elevated fuel mass, floor passage means 12 will provide for the flow of the fuel mass before, and in lieu of, any rupture of the sides of fuel reactor shield 11 whereby such a mass will be caused to flow downwardly only from fuel reactor shield 11.

Deactivating containment base 13 is provided with, among other things, a manifold chamber 20 (FIGS. 1 and 2), dome 21, distribution passages 22, refractory vessels 23, flux infusion plugs 24 and flux infusion rods 25. Manifold chamber 20 is centrally positioned below exhaust passage means 12 and, dome 21 is centrally positioned within chamber manifold 20. Deactivating containment base 13 is shown to be constructed or of concrete or similar material as an intregal part of fuel reactor shield 11 and also forming manifold chamber dome 20.

Distribution passages are radially positioned around the base of dome 21 and 22 open into manifold chamber 20. Passages 22 are also inclined downwardly and away from dome 21 whereby fuel flowing over dome 21 will tend to flow through dispersion passages 22 under the force of gravity. Passages 22, dome 21 and the associated chamber 20 are coated with, for example, tungsten or other similar appropriate material, to prevent molten fuel therein from adversely reacting with the material of base 13.

Soluble fluxing plugs 24 are provided in each of the passages. The fluxing material of this invention should be a substance with which both molten fuel mass and a chosen control substance are mutually soluble under anticipated conditions. Solubility of the fluxing with the control materials aids in distribution of control material throughout the fuel mass to inhibit nuclear reaction in the fuel. An example of fluxing material are those materials used for uranium glass, and an example of a control element is boron or boron compounds. Control substances further inhibit production of heat and isotopes.

Plugs 24 may be composed of fused basalts which will readily dissolve with molten fuel. The plugs 24 will also prevent initial flow of fluid through dispersion passages 22 until plugs 24 are fully dissolved or otherwise melted by the fuel, thus, causing the molten fuel to be backed up in the upper portion of diversion passages 22 into manifold chamber 20 to provide a more equal distribution of the molten fuel with respect to dispersal passages 22. Passages 22 are provided with liners or sleeves 26 of fiberglas, or similar materials (FIG. 3) on collapsible supports 28 (FIG. 5) within jackets 29 to prevent shattering of secondary containment base 13 by expansion of dispersion passage pipe 22. Evacuation of the system is desirable.

As illustrated, dispersion passages or pipes 22 are turned vertically downward 30 near the lower ends thereof (FIGS. 1 and 6) and open into refractory containers or vessels 23, composed of firebrick 21, or similar material, with fluxing and control material contained therein. Passage 32 is provided in refractory material 33 in container 23, to facilitate the positioning and containment of additional fluxing material 34, whereby, fuel flowing from vertical portion 30 of dispersion passages 22 into respective containers 23 will be further subjected to cooling as a result of infusion of fluxing material 34 and control material 33 with the molten fuel.

A second embodiment of the invention is illustrated in FIG. 4 and is generally, a modification of the lower, or end portion, of deactivating containment base 13 of the first embodiment, with an alternate lower extremity of dispersion passages 22 and associated refractory vessels 23. In particular, in this embodiment of the invention, the molten fuel is passed angularly downwardly from dispersion passage 22 into an angular passage 37 and horizontal passage 38 within and around fluxing and control materials such as boron or cadmium compounds. In this regard, the infusion fluxing rods 34 are positioned horizontally and actually centrally in horizontal passage 38 either by fusible struts 40 (FIG. 4) or by an end anchorage into material 33 (FIG. 6) whereby fluxing material will be spaced within passage 38 to allow molten fuel to pass therearound and thereby be readily dissolved therewith.

A third embodiment of this invention is illustrated in FIG. 7 and includes, generally, a fuel reactor shield 41 elevated on a deactivating containment base 43. An open passage means 42 between fuel containment chamber 44 and a manifold chamber 45 directly interconnected by a vertical passage 46, which, in turn, opens upon a dome 47 similar to dome 20 described with respect to the first embodiment, and extends into radially outwardly and downwardly extending dispersion passages 48. Dispersion passages 48 of this embodiment of the invention can be utilized with the flux infusion structures illustrated with respect to the first and second embodiment of this invention (FIGS. 1-6).

A fourth embodiment of this invention is illustrated in FIG. 8 and includes generally, a fuel reactor shield 51 on a deactivating containment base 53. An open passage means 52 is provided between a fuel containment chamber 54 and a manifold chamber 55, directly interconnected by a vertical passage 56 which, in turn opens into vertically positioned dispersion passages 57 which extend radially outwardly and downwardly from vertical passage 56, and into respective refractory vessels. The dispersion passages and refractory vessels are otherwise utilized like those above described with respect to the other embodiments of this invention.

Soluble plugs 58 are variously selectively provided to control the timing of the flow of fluid mass in passages 57 so that the most uniform distribution of the fluid mass can be had.

In operation, when the cooling mechanism, such as water pipes distributed throughout the structure in which the atomic reactor is contained and otherwise associated with, fails for any reason whatsoever, the reactor will elevate rapidly in temperature and will eventually cause the fuel to become a temperature elevated radioactive flowing mass. This mass will first melt the bottom of the primary containment 15 of the reactor and then flow by gravity downwardly upon the floor of reactor shield 11 whereupon the floor 17 thereof, which is either open or provided with a rupture panel which will rupture more readily, and thereby prior to, the rupturing of the walls of reactor shield 11, and thereby will flow through passage means 12 from reactor shield 11 into manifold chamber 20.

Molten fuel flowing into manifold chamber 20 will flow downwardly onto dome 21 and be distributed around the base thereof. Continued flow of the mass will carry the mass into the upper portions of diffusion passages 22 and against soluble plugs 24. Plugs 24 will temporarily retain the flow of the molten fuel causing the fuel to be backed up into manifold chamber 20 more evenly distribute the fuel around the base of the dome, in the event of any irregularity in the flow of the fluid around the dome upon its initial contact therewith. Infusion plugs which are preferably made of fused fluxing material or fused basalts and will be dissolved in the molten fuel tending to cool the fuel and when sufficiently dissolved or infused by the fuel will open up dispersal passage to allow the fuel to flow downwardly and outwardly in multiple passages, thereby further dividing and dispersing the fuel to lower the temperature and isotope production thereof.

Further flow of the fuel downwardly in passages will result in the flow of fluid into the refractory vessels and additional fluxing material in passage of the fluxing over and around material contained in the vessel to again apply fluxing material to the dispersed fuel and thereby further cool the fuel to a less dangerous temperature.

In operation of the second embodiment of this invention (FIG. 4) the fuel mass will flow as it did with respect to the first embodiment and will thus be cooled and dispersed into dispersion passages. However, the molten fuel flowing from passages 37 into refractory containers 31 will proceed therein at an angle and then horizontally over and around fluxing material 34 in passage to finally provide sufficient dissolution of the mass to lower the temperature thereof below the dangerous point.

In the operation of the third embodiment of this invention (FIG. 7) the molten radioactive mass that may be formed in the reactor shield 41 will flow through open passage means 42 into a manifold chamber 45 which will direct the super critically elevated fuel mass through a vertical passage 46 and directly over a dispersion dome 47 whereby the fuel will be distributed through multiple dispersion passages 48. Thereafter the molten fuel will be received and fluxed in accordance with either of the structures of the first or second embodiments of this invention, as above described, to finally lower the temperature of the fuel mass to below the dangerous level.

In operation of the fourth embodiment of this invention (FIG. 8) the molten radioactive mass that may be found in the reactor chamber of shield 51 will flow through open passage means 52 into manifold chamber 55 which will direct the molten fuel mass through extended vertical passage 56 and directly into passages 57. Plugs 58 will act much like plugs 24 of the first embodiment of this invention, with plug 58 in extended vertical passage being in direct line of the flow of fuel as was dome 21.

Thus, it can be seen that the nuclear reactor fuel containment safety structure of this invention provides a means whereby any radioactive molten fuel mass formed within the fuel reactor shield will be automatically dispersed into multiple parts whereby the regenerative critical heating characteristics thereof will, by dispersal be greatly reduced. Moreover, the nuclear reactor fuel containment safety structure of this invention provides a dispersion means which is efficient, due to the provision of means for uniformly distributing the molten fuel means into the dispersion structure. Further, fluxing dispersion means is provided within the dispersion structure whereby additional cooling, as a result of the fluxing effects, are provided within the dispersion structures of this invention to further lower the temperature of the radioactive and temperature elevated flowing fuel mass to lower the temperature below the dangerous range to a safe temperature. All of these functions are provided without reliance on auxillary water cooling, or other cooling systems, which have been relied on in the past and which are subject to rupture and other malfunction and, all automatically without being subject to the deficiency associated with reliance human reaction or intricate mechanical interlocked or interconnected systems which are so readily subject to failure.

Changes may be made in the form, construction and arrangement of parts from that disclosed herein without in any way departing from the spirit of the invention or sacrificing any of the attendant advantages thereof, provided, however, that such changes fall within the scope of the claims appended hereto.

What is claimed is:

1. A nuclear reactor fuel containment safety structure for fuel of an atomic reactor in a primary containment and capable of heating to melt down temperatures if not properly cooled, and having means normally provided for cooling of the fuel comprising a fuel reactor shield having a fuel containment chamber adapted to contain the atomic reactor and reactor fuel therein, said fuel chamber having an exhaust passage means in the bottom thereof adapted to allow passage of a radioactive molten mass therethrough from said fuel chamber; a deactivating containment base attached to and extending generally downwardly from said fuel reactor shield at said exhaust passage means of said chamber for receiving any radioactive fuel flow from said chamber, whereby a molten radioactive mass formed by said reactor in said fuel reactor shield will pass into said deactivating containment base to be deactivated; said deactivating base has remotely located diffusing means for receiving a radioactive means flowing thereinto from said fuel chamber through said exhaust passage to diffusibly separate said fuel into remotely located parts to reduce the temperature of the mass, whereby a molten radioactive mass formed by said reactor in said fuel reactor shield will pass into said deactivating containment base to be dispersed to cool said mass; said deactivating base has flux material infusing means and poison control substance adapted to receive the dispersed flowing radioactive masses whereby said masses will be further cooled as a result of the fluxing action and the action of the poison control substance infused into the mass by the fluxing material; said flux material is positioned in said dispersing means for receiving the flowing radioactive mass to be infused therein for further cooling said mass, said diffusing means comprises a dispersion manifold chamber below said passage means for receiving fuel flow thereinto said chamber having a fuel receiving dome with the surface thereof centered below said passage means and being larger at its base than at the top thereof whereby fuel flowing thereonto, will flow downwardly thereover and therearound to diffuse said fuel around the base of said receiving dome; said diffusion means comprises multiple spaced apart passages extending radially outwardly and downwardly from said dispersion manifold chamber at the base of said dome for receiving fuel flow from said dome to further diffuse said fuel into said passages to further cool said fuel; wherein fluxing means is positioned in said dispersion passages for receiving said fuel and to infuse therewith to cool said fuel; and said fluxing means includes soluble melt plugs in said passages to temporarily stop flow of said fuel as said plugs are dissolved or melted causing a temporary backup of fuel to balance the fuel load in each diffusion passage.

* * * * *